US008882581B2

United States Patent

(12) United States Patent
Roukis et al.

(10) Patent No.: US 8,882,581 B2
(45) Date of Patent: Nov. 11, 2014

(54) GAME CONTROLLER, A GAMING SYSTEM, AND A METHOD OF GAMING

(71) Applicant: Aristocrat Technologies Australia Pty Limited, North Ryde (AU)

(72) Inventors: George Roukis, Miranda (AU); Nicholas Luke Bennett, Manly Vale (AU)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 13/925,492

(22) Filed: Jun. 24, 2013

(65) Prior Publication Data

US 2014/0011566 A1 Jan. 9, 2014

Related U.S. Application Data

(63) Continuation of application No. 12/340,686, filed on Dec. 20, 2008, now Pat. No. 8,469,794, which is a continuation-in-part of application No. PCT/IB2007/054118, filed on Oct. 9, 2007.

(30) Foreign Application Priority Data

Aug. 17, 2007 (AU) ................................ 2007209823
Dec. 20, 2007 (AU) ................................ 2007907034

(51) Int. Cl.

*A63F 9/24* (2006.01)
*A63F 13/00* (2014.01)
*G07F 17/34* (2006.01)
*G07F 17/32* (2006.01)

(52) U.S. Cl.

CPC ............ *G07F 17/34* (2013.01); *G06F 17/3258* (2013.01); *G07F 17/32* (2013.01)

USPC .................... 463/20; 463/16; 463/26; 463/27

(58) Field of Classification Search

None

See application file for complete search history.

(56) References Cited

U.S. PATENT DOCUMENTS 2,452,341 A 10/1948 Wasserman
4,842,278 A 6/1989 Markowicz (Continued)

FOREIGN PATENT DOCUMENTS

EP 1380998 A2 1/2004
WO 2006014770 A2 2/2006

OTHER PUBLICATIONS

International Search Report corresponding to International Application No. PCT/IB2007/054118, mailed Oct. 9, 2009,1 page.

(Continued)

*Primary Examiner* — Dmitry Suhol
*Assistant Examiner* — Jason Yen
(74) *Attorney, Agent, or Firm* — McAndrews, Held & Malloy, Ltd.

(57) ABSTRACT

A method of gaming comprising: a) displaying a plurality of display positions to a player, at least one of the display positions corresponding to a hidden object to be sought by the player; b) determining a selection of a display position; c) revealing whether or not the selected display position corresponds to the hidden object; e) determining whether to allow a selection by conducting at least one trial, each trial comprising seeking to complete a symbol combination; and f) repeating steps b) to e) until either the symbol combination is completed or a designated number of hidden objects is located.

12 Claims, 13 Drawing Sheets

(56) References Cited

U.S. PATENT DOCUMENTS

| | | | | |
|---|---|---|---|---|
| 5,186,463 | A | 2/1993 | Marin et al. | |
| 5,833,537 | A | 11/1998 | Barrie | |
| 5,931,467 | A | 8/1999 | Kamille | |
| 6,224,482 | B1 * | 5/2001 | Bennett | 463/20 |
| 6,283,855 | B1 | 9/2001 | Bingham | |
| 6,645,074 | B2 | 11/2003 | Thomas et al. | |
| 7,137,886 | B2 | 11/2006 | Locke et al. | |
| 7,530,893 | B2 | 5/2009 | Thomas | |
| 7,862,427 | B2 * | 1/2011 | Nguyen et al. | 463/27 |
| 2001/0031664 | A1 | 10/2001 | Acres | |
| 2003/0022711 | A1 | 1/2003 | Locke et al. | |
| 2003/0060258 | A1 | 3/2003 | Coleman et al. | |
| 2003/0228899 | A1 | 12/2003 | Evans | |
| 2004/0023714 | A1 | 2/2004 | Asdale | |
| 2005/0032565 | A1 | 2/2005 | Cheng et al. | |
| 2005/0037833 | A1 | 2/2005 | Perrie et al. | |
| 2005/0056999 | A1 | 3/2005 | Roemer et al. | |
| 2006/0030403 | A1 * | 2/2006 | Lafky et al. | 463/27 |
| 2006/0073880 | A1 | 4/2006 | Thomas | |
| 2006/0073887 | A1 | 4/2006 | Nguyen et al. | |
| 2006/0116188 | A1 | 6/2006 | Blankstein | |
| 2008/0188295 | A1 | 8/2008 | Seelig et al. | |
| 2009/0124332 | A1 | 5/2009 | Baerlocher | |

OTHER PUBLICATIONS

Non-Final Office Action corresponding to U.S. Patent Appl. No. 11/844,689, May 3, 2011.

Final Office Action corresponding to U.S. Appl. No. 11/844,689, Nov. 16, 2011.

Notice of Allowance corresponding to U.S. Appl. No. 11/844,689, Apr. 10, 2013.

Non-Final Office Action corresponding to U.S. Appl. No. 12/340,686, Jul. 8, 2011.

Final Office Action corresponding to U.S. Appl. No. 12/340,686, Mar. 7, 2012.

Non-Final Office Action corresponding to U.S. Appl. No. 12/340,690, Sep. 30, 2011.

Final Office Action corresponding to U.S. Appl. No. 12/340,690, Oct. 16, 2012.

Non-Final Office Action corresponding to U.S. Appl. No. 12/340,690, Jun. 19, 2013.

* cited by examiner

326

328

330

332

GAME CONTROLLER, A GAMING SYSTEM, AND A METHOD OF GAMING

RELATED APPLICATIONS

This application is a continuation of U.S. application Ser. No. 12/340,686, filed Dec. 20, 2008, now issued U.S. Pat. No. 8,469,794, which is a continuation in part of International Application No. PCT/IB07/54118 having an effective international filing date of Aug. 18, 2007, and an actual filing date of Oct. 9, 2007, which is based on Australian Patent Application No. AU 2006904518 filed on Aug. 18, 2006. The 118 International Application is incorporated herein by reference. This application further claims priority to Australian Provisional Application No. AU 2007907304 filed Dec. 20, 2007 which is incorporated herein by reference. This application further claims priority to Australian Application No. AU 2007209823 filed Aug. 17, 2007 which in turn is based on Australian Patent Application No. AU 2006904518.

This application is also based on Australian provisional patent application no. 2007907034, the disclosure of which is incorporate herein by reference.

FEDERALLY SPONSORED RESEARCH OR DEVELOPMENT

[Not Applicable]

MICROFICHE/COPYRIGHT REFERENCE

[Not Applicable]

FIELD OF THE INVENTION

The invention relates to a game controller, a gaming system and a method of gaming.

BACKGROUND OF THE INVENTION

It is known to provide gaming systems which implement games where players make a selection to select one of a plurality of display positions. For example, as a feature game wherein after a player makes a selection, a prize (or no prize) associated with the display position is revealed and the prize awarded to the player.

While such gaming systems provide users with enjoyment, a need exists for alternative gaming systems in order to maintain or increase player enjoyment.

BRIEF SUMMARY OF THE INVENTION

In a first aspect, the invention provides a method of gaming comprising:

a) displaying a plurality of display positions to a player, at least one of the display positions corresponding to a hidden object to be sought by the player;

b) determining a selection of a display position;

c) revealing whether or not the selected display position corresponds to the hidden object;

e) determining whether to allow a selection by conducting at least one trial, each trial comprising seeking to complete a symbol combination; and f) repeating steps b) to e) until either the symbol combination is completed or a designated number of hidden objects is located.

In an embodiment, the designated number of hidden objects is one.

In an embodiment, the designated number of hidden objects is more than one.

In an embodiment, steps b) to e) involve one player selection and one trial.

In an embodiment, steps b) to e) involve more player selections than trials.

In an embodiment, steps b) to e) involve more trials than player selections.

In an embodiment, each trial comprises seeking to select one or more of the symbols of the symbol combination from a pool of possible selections.

In an embodiment, each trial comprises spinning at least one reel having at least one of the symbols of the symbol combination thereon and completing at least part of the symbol combination if a portion of the reel having a symbol of the symbol combination thereon stops at a designated display position.

In an embodiment, the method comprises providing a plurality of reels each having one of the symbols required to complete the symbol combination, and wherein a first trial comprises spinning all of the reels and subsequent trials comprise spinning each reel corresponding to uncompleted portions of the symbol combination.

In an embodiment, the method comprises providing a plurality of reels each having one of the symbols required to complete the symbol combination, wherein the reels are spun one at a time in a defined order and wherein if a trial successfully produces part of the symbol combination, the next reel is spun prior to allowing a further selections such that the number of reel spins between selections varies depending on success, and wherein each new trial begins with a reel for which the symbol required to complete the symbol combination has not been obtained.

In an embodiment, each reel has one or more of the symbols required to complete the symbol combination and the remainder of the reel is blank.

In an embodiment, the symbol combination is a word and each of the symbols required to complete the symbol combinations are individual letters of the word.

In an embodiment, the display positions are displayed in a first display area and each trial is displayed in a second display area.

In an embodiment, the method comprises making an award to a player if the designated number of objects is located prior to the symbol combination being completed.

In an embodiment, the method comprises making an award to a player if the symbol combination is completed prior to the designated number of objects being located.

In an embodiment, the method comprises receiving the display position selection from the player.

In an embodiment, step e) is performed before step b) such that step b) is not performed until the outcome of a trial is that a position selection is to be determined.

In an embodiment, step e) is performed after step b) such that a trial is conducted to determine whether a further selection is to be determined.

In a second aspect, the invention provides a game controller for a gaming system, the game controller arranged to:

a) cause a display to display a plurality of display positions to a player, at least one of the display positions corresponding to a hidden object to be sought by the player;

b) determine at least one selection of a display position;

c) reveal whether or not the selected display position corresponds to the hidden object;

e) determine whether to allow a selection by conducting at least one trial, each trial comprising seeking to complete a symbol combination; and f) repeat b) to e) until either the symbol combination is completed or the designated number of hidden objects is located.

In an embodiment, the designated number of hidden objects is one.

In an embodiment, the designated number of hidden objects is more than one.

In an embodiment, each trial comprises the game controller seeking to select one or more of the symbols of the symbol combination from a pool of possible selections.

In an embodiment, each trial comprises the game controller spinning at least one reel having at least one of the symbols of the symbol combination thereon and completing at least part of the symbol combination if a portion of the reel having a symbol of the symbol combination thereon stops at a designated display position.

In an embodiment, the game controller is arranged to spin each at least one reel by selecting a stop position of the reel and controlling the reel to stop at the selected position.

In an embodiment, there are a plurality of reels each having one of the symbols required to complete the symbol combination, and the game controller is arranged to conduct a first trial by spinning all of the reels and subsequent trials by spinning each reel corresponding to uncompleted portions of the symbol combination.

In an embodiment, there are a plurality of reels each having one of the symbols required to complete the symbol combination, wherein the reels are spun one at a time in a defined order and wherein if a trial successfully produces part of the symbol combination, the next reel is spun prior to allowing a further selections such that the number of reel spins between selections varies depending on success, and wherein each new trial begins with a reel for which the symbol required to complete the symbol combination has not been obtained.

In an embodiment, each reel has one or more of the symbols required to complete the symbol combination and the remainder of the reel is blank.

In an embodiment, the symbol combination is a word and each of the symbols required to complete the symbol combinations are individual letters of the word.

In an embodiment, the game controller is arranged to make an award to a player if the designated number of objects is located prior to the symbol combination being completed.

In an embodiment, the game controller is arranged to make an award to a player if the symbol combination is completed prior to the designated number of objects being located.

In an embodiment, the game controller is arranged to receive the display position selection from the player.

In an embodiment, the game controller is arranged such that the at least one position is not determined until the outcome of a trial is that a position selection is to be determined.

In an embodiment, the game controller is arranged such that a trial is conducted to determine whether a further selection is to be determined.

In an embodiment, the game controller is implemented by a processor arranged to execute code in a memory.

In a third aspect, the invention provides a gaming system comprising:

a player interface comprising at least one display; and a game controller arranged to:

a) display a plurality of display positions to a player on the display, at least one of the display positions corresponding to a hidden object to be sought by the player;

b) determine at least one selection of a display position;

c) reveal whether or not the selected display position corresponds to the hidden object;

e) determine whether to allow a selection by conducting at least one trial, each trial comprising seeking to complete a symbol combination; and f) repeat b) to e) until either the symbol combination is completed or the designated number of hidden objects is located.

In an embodiment, the player interface comprises a game play mechanism operable by the player to select one of the display positions.

In an embodiment, the game controller is arranged to display the display positions in a first display area and each trial in a second display area of the at least one display.

In an embodiment, the player interface comprises at least two displays and the first and second display areas are on to different ones of the at least two displays.

In an embodiment, the game play mechanism comprises at least one touch screen, whereby a player selects a display position by touching a portion of the touch screen corresponding to the display position.

In an embodiment, the game play mechanism is operable by the player to make a wager.

In an embodiment, the designated number of hidden objects is one.

In an embodiment, each trial comprises the game controller seeking to select one or more of the symbols of the symbol combination from a pool of possible selections.

In an embodiment, each trial comprises the game controller spinning at least one reel having at least one of the symbols of the symbol combination thereon and completing at least part of the symbol combination if a portion of the reel having a symbol of the symbol combination thereon stops at a designated display position.

In an embodiment, the gaming system as claimed is arranged to spin each at least one reel by selecting a stop position of the reel and controlling the reel to stop at the selected position.

In an embodiment, there are a plurality of reels each having one of the symbols required to complete the symbol combination, and the game controller is arranged to conduct a first trial by spinning all of the reels and subsequent trials by spinning each reel corresponding to uncompleted portions of the symbol combination.

In an embodiment, there are a plurality of reels each having one of the symbols required to complete the symbol combination, wherein the reels are spun one at a time in a defined order and wherein if a trial successfully produces part of the symbol combination, the next reel is spun prior to allowing a further selections such that the number of reel spins between selections varies depending on success, and wherein each new trial begins with a reel for which the symbol required to complete the symbol combination has not been obtained.

In an embodiment, each reel has one or more of the symbols required to complete the symbol combination and the remainder of the reel is blank.

In an embodiment, the symbol combination is a word and each of the symbols required to complete the symbol combinations are individual letters of the word.

In an embodiment, the game controller is arranged to make an award to a player if the designated number of objects is located prior to the symbol combination being completed.

In an embodiment, the game controller is arranged to make an award to a player if the symbol combination is completed prior to the designated number of objects being located.

In an embodiment, the game controller is arranged such that the at least one position is not determined until the outcome of a trial is that a position selection is to be determined.

In an embodiment, the game controller is arranged such that a trial is conducted to determine whether a further selection is to be determined.

In an embodiment, the gaming system comprises a processor arranged to execute code in a memory to implement the game controller.

In a fourth aspect, the invention provides computer program code which when executed implements the above method.

In a fifth aspect, the invention provides a computer readable medium comprising the above program code.

In a sixth aspect, the invention provides a data signal comprising the above program code.

hi a seventh aspect, the invention extends to transmitting the above program code.

Further aspects of the present invention will become apparent from the following description, given by way of example only and with reference to the accompanying drawings.

DETAILED DESCRIPTION OF THE INVENTION

Figure 1:
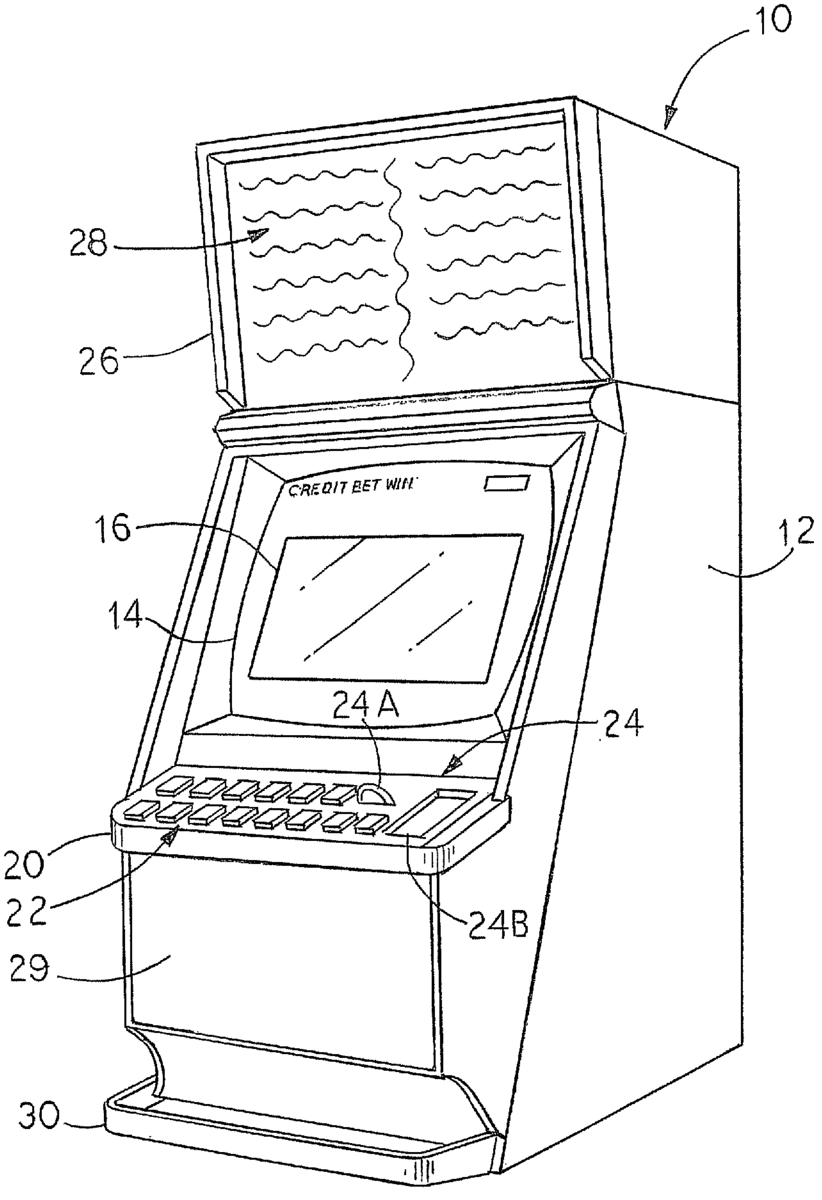
FIG. 1: shows diagrammatically, a view of a gaming machine suitable for implementing the present invention.

Referring to the drawings, there is shown a gaming system having a game controller arranged to implement a game where there is, in effect, a race to determine whether one or more hidden objects hidden at at least one display position will be located before a symbol combination is completed. In a specific embodiment, the game involves a player making selections of the display positions and reels being spun in order to try to complete the symbol combination. The game may have a number of themes, but in an example, a player attempts to locate a bandit before a symbol combination in the form of a word is completed.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 16:
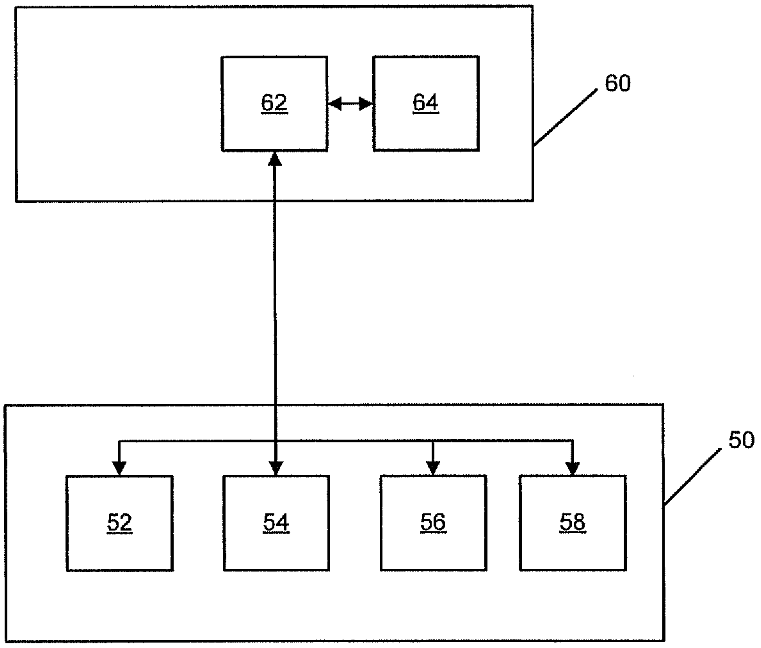
FIG. 16: is a block diagram of the core components of a gaming system.

Irrespective of the form, the gaming system comprises several core components. At the broadest level, the core components are a player interface 50 and a game controller 60 as illustrated in FIG. 16. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

In FIG. 1 of the accompanying drawings, one example of a gaming machine suitable for implementing the present invention is generally referenced by arrow 10.

The gaming machine 10 includes a console 12 having a display 14 on which is displayed representations of a game 16, that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. Further artwork and/or information may be provided on the front panel 29 of the console 12. A coin tray 30 is mounted beneath the console 12 for cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. In advantageous embodiments, the top box 26 may include a display, for example a video display unit, which may be of the same type as the display 14, or a different type of display.

Figure 2:
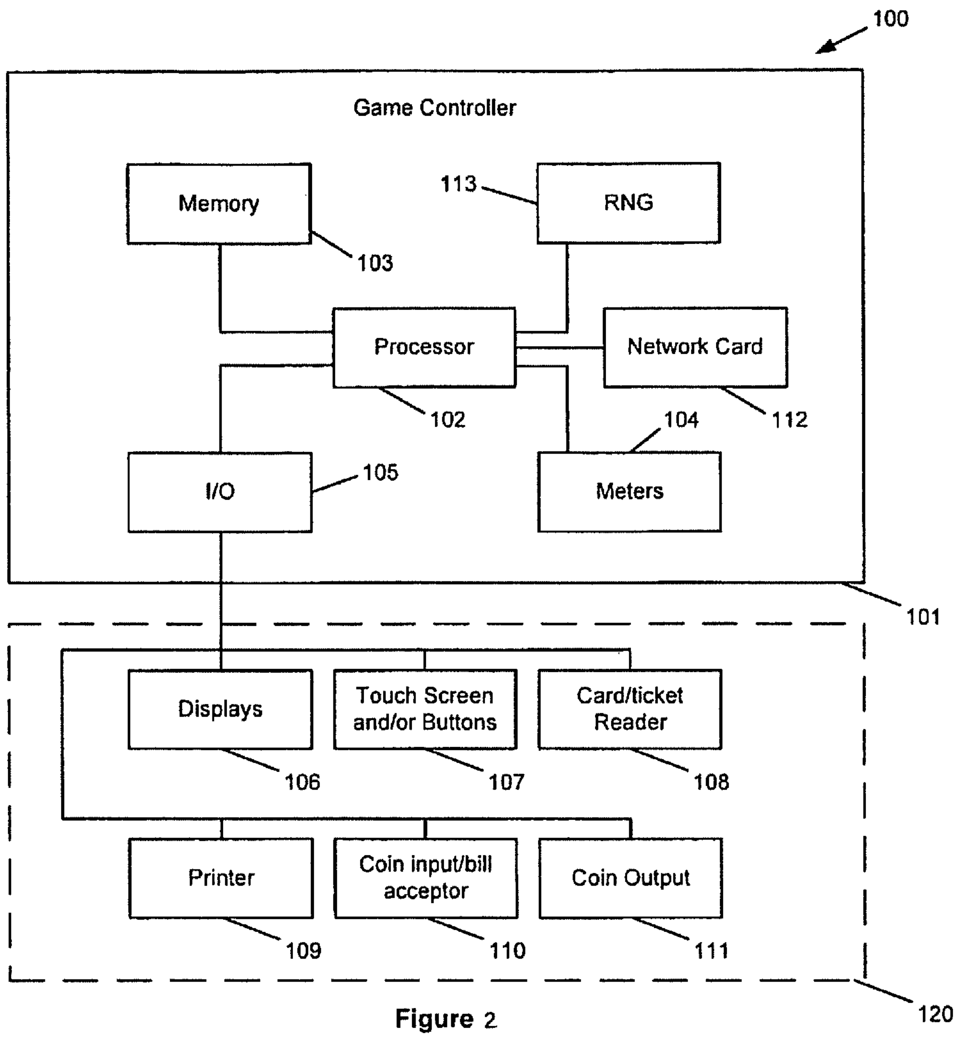
FIG. 2: shows a block diagram of gaming apparatus suitable for implementing the present invention.

FIG. 2 shows a block diagram of a gaming apparatus, generally referenced by arrow 100, suitable for implementing the present invention. The gaming apparatus 100 may, for example, operate as a standalone gaming machine of the type shown in FIG. 1. However, the gaming apparatus 100 may alternatively operate as a networked gaming machine, communicating with other network devices, such as one or more servers or other gaming machines. The gaming apparatus 100 may also have distributed hardware and software components that communicate with each other directly or through a network. Accordingly, different reference numerals have been used in FIG. 2 from FIG. 1 for components that may be equivalent.

The gaming apparatus 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with, or forms a part of, the computational device 102. Typically, the gaming apparatus 100 will include both volatile and non-volatile memory and more than one of each type of memory, with such memories being collectively represented by the memory 103. The instructions to cause the game controller 101 to implement the present invention will be stored in the memory 103.

The gaming apparatus may include hardware meters 104 for the purposes of regulatory compliance and also include an input/output (I/O) interface 105 for communicating with the peripheral devices of the gaming apparatus 100. The input/output interface 105 and/or the peripheral devices may be intelligent devices with their own memory for instructions and data.

In the example shown in FIG. 2, the peripheral devices that communicate with the controller are one or more displays 106, user input devices 107 (e.g. buttons or a touch screen), a card and/or ticket reader 108, a printer 109, a bill acceptor and/or coin input mechanism 110 and a coin output mechanism 111. One or more of the displays 106 may include a touch screen, forming part of the user input devices 107 (which may also include buttons). Additional devices may be included as part of the gaming machine 100, or devices omitted as required for the specific implementation.

In addition, the gaming machine 100 may include a communications interface, for example a network card 112. The network card, may for example, send status information, accounting information or other information to a central controller, server or database and receive data or commands from the central controller, server or database. One or more of the peripheral devices, for example the card/ticket reader 108 may be able to communicate directly with the network card 112.

The game controller 101 may also include a random number generator 113, which generates a series of random numbers that determine the outcome of a series of random game events played as part of a game on the gaming apparatus 100. As explained in more detail in relation to FIG. 4, the computational device 102 may include two or more controllers or processors, which may be local or remote from each other and the displays 106. It will be appreciated that the random number generator may generate pseudo-random or true-random numbers depending on how it is configured.

Figure 3:
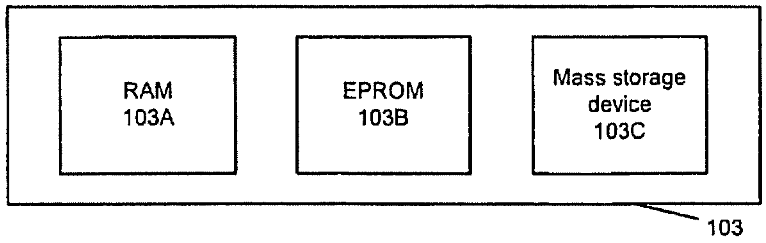
FIG. 3: shows a block diagram of components of the memory of the gaming apparatus represented in FIG. 2.

FIG. 3 shows an exemplary block diagram of the main components of the memory 103. The RAM 103A typically temporarily holds program files for execution by the computational controller 102 and related data. The EPROM 103B may hold be a boot ROM device and/or may contain some system or game related code. The mass storage device 103C is typically used to store game programs, the integrity of which may be verified and/or authenticated by the computational controller 102 using protected code from the EPROM 103B or elsewhere.

Figure 4:
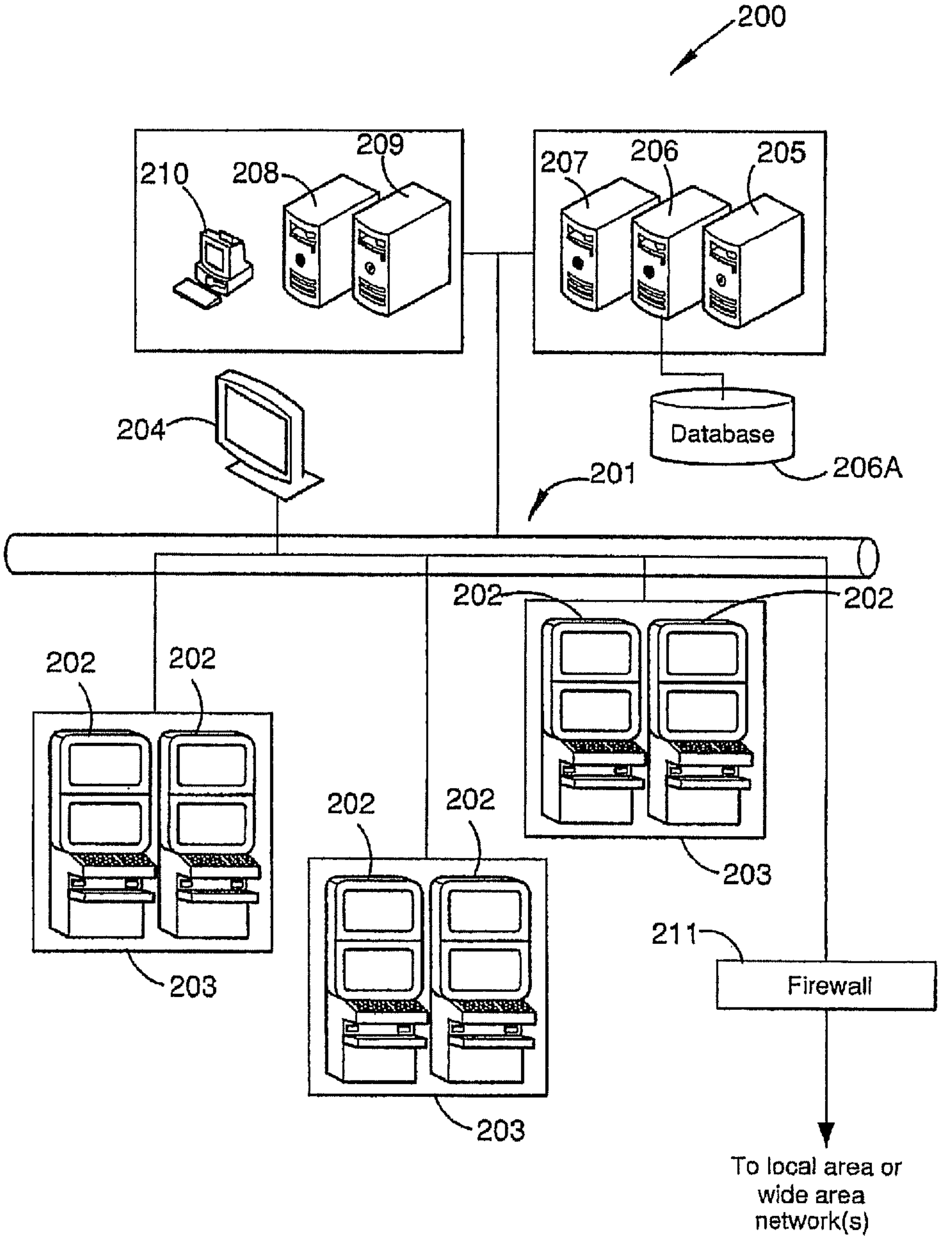
FIG. 4: shows diagrammatically, a network gaming system suitable for implementing the present invention.

FIG. 4 shows a gaming system 200. The gaming system 200 includes a network 201, which for example may be an Ethernet network. Gaming devices 202, shown arranged in three banks 203 of two gaming devices 202 in FIG. 4, are connected to the network 201. The gaming devices 202 may be gaming machines 10, as shown in FIG. 1 or form part or all of another gaming apparatus 100. Single gaming devices 202 and banks 203 containing three or more gaming devices 202 may also be connected to the network 201.

One or more displays 204 may also be connected to the network 201. The displays 204 may, for example, be associated with a bank 203 of gaming devices. The displays 204 may be used to display representations associated with game play on the gaming devices 202, and/or used to display other representations, for example promotional or informational material.

Servers may also be connected to the network 201. For example, a game server 205 may generate game outcomes for games played on the gaming devices 202, a database management server 206 may manage the storage of game programs and associated data for downloading or access by the gaming devices 202 in a database 206A, and a jackpot server 207 may control one or more jackpots associated with the gaming devices 202.

Further servers may be provided to assist in the administration of the gaming system 200, including for example a gaming floor management server 208, and a licensing server 209 to monitor the use of licenses to particular games. An administrator terminal 210 is provided to allow an administrator to run the network 201 and the devices connected to the network.

The gaming system 200 may communicate with other gaming systems, other local networks, for example a corporate network and/or a wide area network such as the Internet through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

First Embodiment

Figure 15:
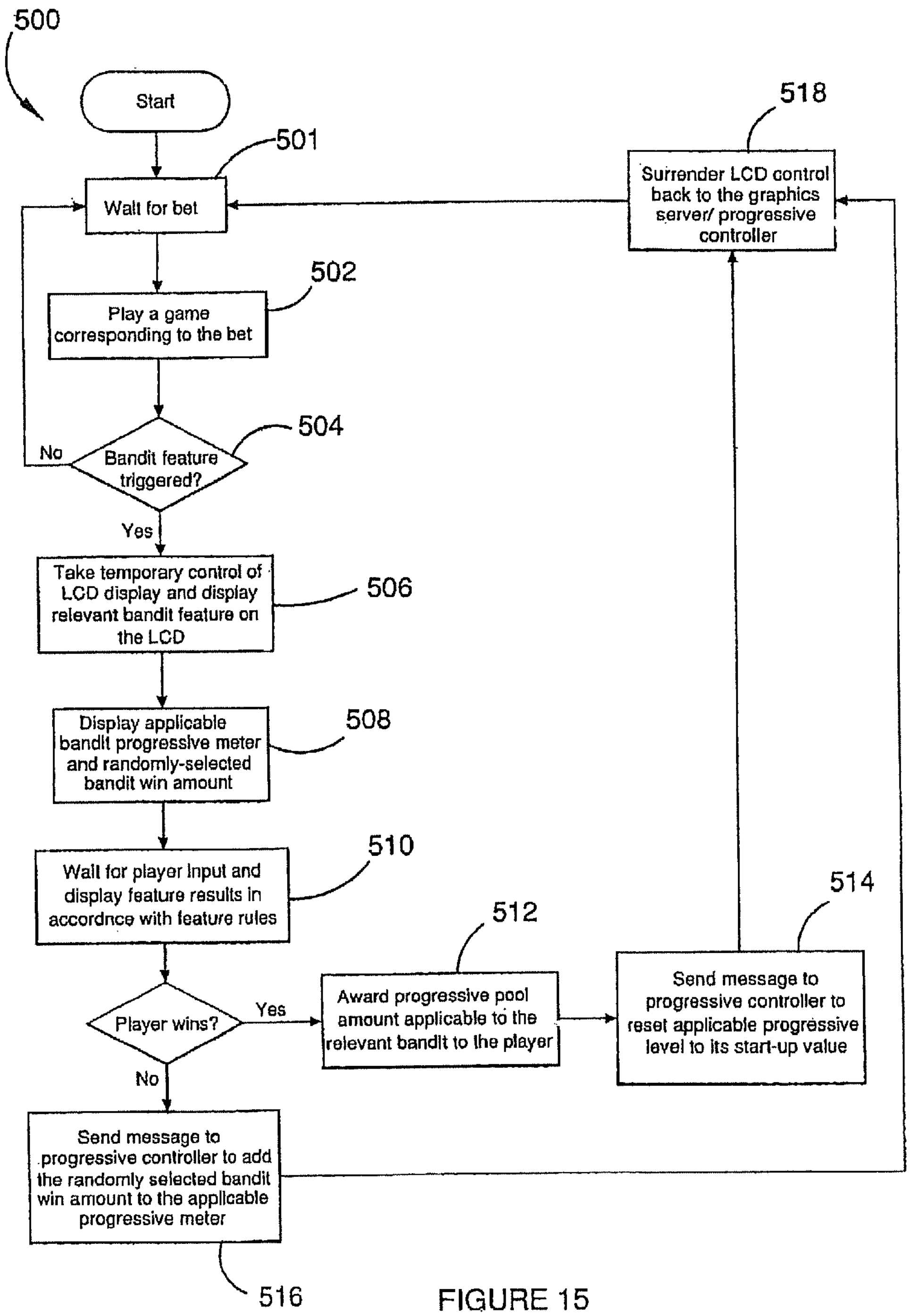
FIG. 15: shows a flowchart of a game process in accordance with an embodiment of the present invention.

FIG. 15 shows a process flow diagram 500 of a process performed in accordance with an embodiment of the present invention. The process may be performed by the network gaming system 200, in which the gaming devices 202 may each comprise part or all of a gaming apparatus 100 and the following description assumes this implementation. However, those skilled in the relevant arts will appreciate that the process will also be able to be implemented by other gaming systems. The process shown in FIG. 15 is described below with reference to a set of exemplary screen shots of a game.

Figure 5:
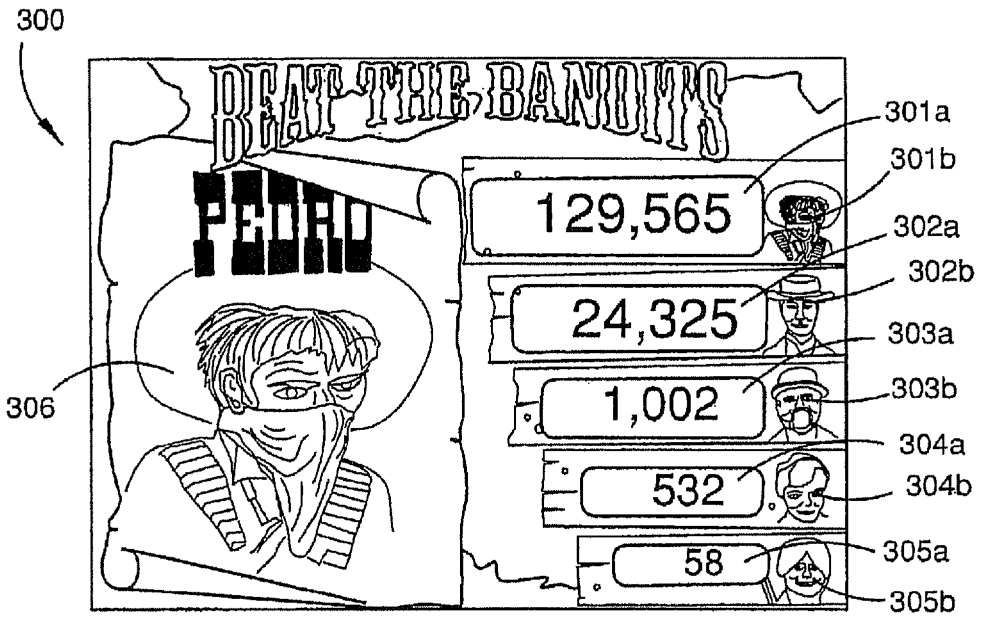
FIG. 5: shows a screen display of one of a plurality of game features available in a first embodiment of the feature game of the present invention.

Referring now to FIG. 5, a screen shot 300 may be displayed on a LCD screen or CRT display occupying the top box 26 and/or may appear on the display 204, which may be located near to gaming devices 202 that can play a game associated with the screen shot 300. In the screen shot 300, a plurality of prize pool amounts are shown 301*a* to 305*a*, together with a representation of a corresponding character or 'bandit' 301*b* to 305*b*. A larger illustration of one of the bandits 301*b*-305*b*, in this example the bandit 306, may also be shown, the bandit 306 alternating between different characters as time progresses as an attract screen display.

Display of the screen shot 300 may be under the control of the jackpot server 207, which may communicate directly or indirectly with the display in the top box 26 and display 204. Alternatively, the display in the top box 26 may be controlled by the game controller 101.

A plurality of gaming devices 202 each provide a game, which may be the same game or different games. In a preferred embodiment of the invention as presently contemplated, the game includes a chance to win one of the prize pool amounts 301*a* to 305*a* in a feature game. Each prize pool amount 301*a* to 305*a* may have its own associated feature game.

Figure 6:
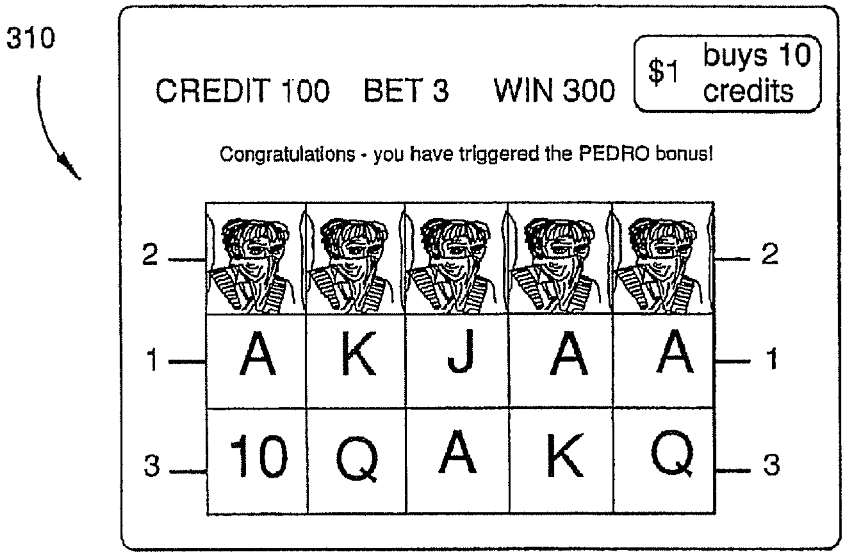
FIG. 6: shows a screen display of the results of a game indicating an exemplary feature game has been triggered.

The feature game associated may be triggered during play of the game in a number of different ways. An exemplary diagrammatic representation of a game screen 310 is shown in FIG. 6, the game being a spinning reel game with five spinning reels, each of which display three symbols to form outcomes of the game. The outcomes of the exemplary game are the symbols in the pay lines 1 to 3 shown in FIG. 6.

After a bet has been placed at step 501, the spinning reel game may be played (step 502). The spinning reel game may result in the occurrence of a predetermined symbol based trigger event occurring (determined in step 504) in the game. In FIG. 6, the occurrence of five PEDRO symbols in pay line 2 may be a trigger event for the feature game and provided the player has purchased play of pay line 2, then the feature will be commenced by the jackpot server 207 taking control of a display 106 of the gaming device 202 to display the feature (step 506). In this embodiment, the reels of the spinning reel game include trigger symbols that are associated with the various prize pool amounts 301*a* to 305*a*, with particular trigger symbols resulting in play for a particular prize pool.

Alternatively, the feature may be triggered according an event that occurs independently of any particular outcome of the game, for example based on turnover of the game as described in Australian patent number 754689, the contents of which are hereby incorporated herein by reference. In this case there may be only a single prize pool, or alternatively, where multiple prize pools are provided the prize pool that is played for may be selected randomly.

Figure 7:
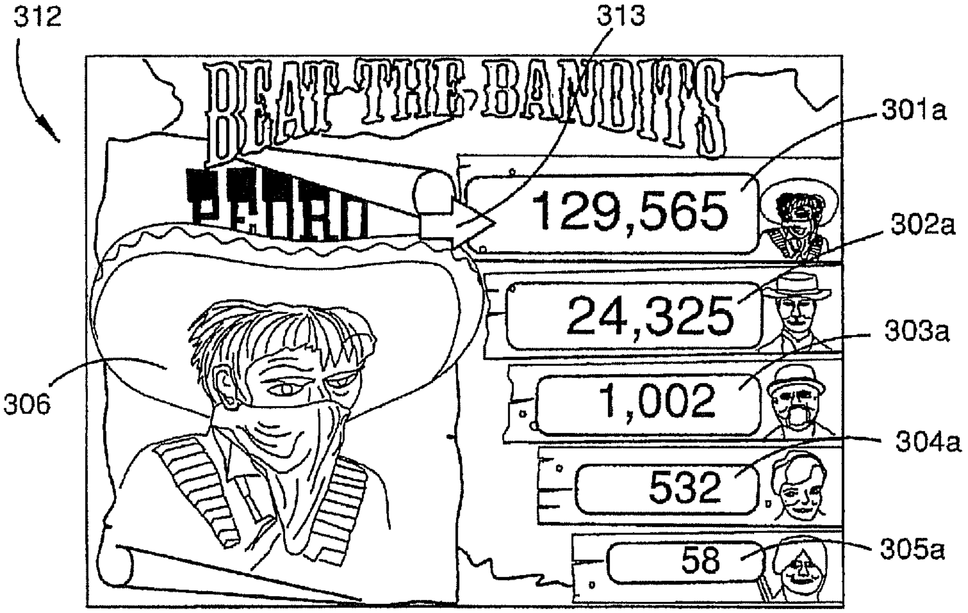
FIG. 7: shows an attract screen display of a game feature which has been triggered from the game of FIG. 4.

After the base game has been completed and a feature game triggered, the jackpot server 207 may cause the feature screen display 312 of FIG. 7 to be displayed on the display 106, in which the bandit 306 is shown enlarged and an indicator is displayed to highlight the jackpot amount associated with the bandit (e.g. the arrow 313). A corresponding screen display may be displayed on the display 204. This display may replace the game display on the gaming device 202, or alternatively be presented on a separate display, for example in a display provided in the top box 26.

Figure 8:
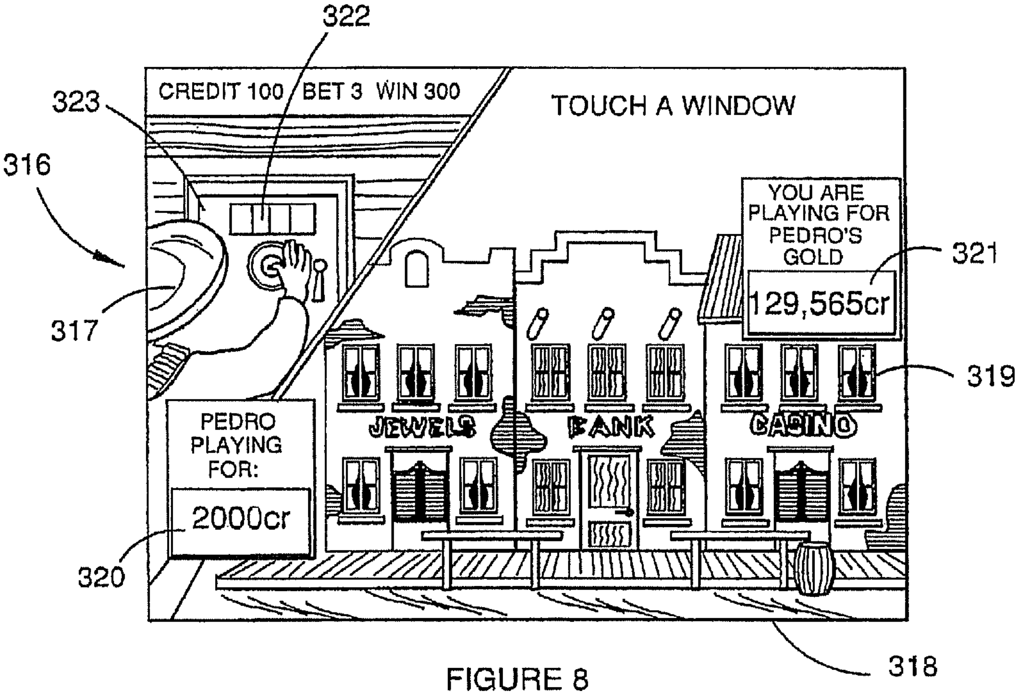
FIG. 8: shows a screen display of a game feature of FIG. 5 in its initial configuration.

After a short period of time, the display of FIG. 7 is replaced with the screen display 316 of FIG. 8, shown as one example game feature. The screen display is split into two sections; section 317 showing the bandit character (PEDRO) attempting to access a safe and section 318 showing a series of buildings with windows 319, one window 319 being arbitrarily selected by the computer prior to the commencement of the feature game as a window behind which PEDRO is hiding. Alternatively, whether PEDRO is hiding behind a window 319 may be determined when that window is selected, with a 1 in 15 chance for the first window, a 1 in 14 chance for the second window and so on.

The feature game has two outcomes, a winning outcome in which the player of the gaming device 202 is awarded the prize pool 301*a* and a losing outcome, in which the player is not awarded the prize pool 301*a* and the prize pool is incremented. The increment amount may be viewed as an amount that the bandit PEDRO is playing for and the prize pool 301*a* may be viewed as an amount that the player is playing for in a competition. A consolation prize may be awarded to the player of the gaming device 202 if the losing outcome occurs. Although the examples described herein are for feature games with only two outcomes, the feature game may also have other winning or losing outcomes associated with other game events, such as the award of a fixed value prize or the award of a number of free games.

The amount that the bandit is playing for is displayed as shown at 320 and the award amount 301*a* is displayed at 321 (step 508). The amount displayed at 320 may be randomly selected from a set of predetermined potential increment amounts or from a range of potential increment amounts. Therefore, the increment amount may vary between occurrences of the feature game. The amount could alternatively be set for every occurrence of the feature game.

The amount that the player is playing for may be determined by the amount of credits bet per line in the game play that triggered the feature game, multiplied by the award amount 301*a*. In the example shown, the amount shown at 321 is the award amount 301*a*, as one credit only was bet per line. If two credits per line had been bet in the underlying base game, then the amount shown at 321 in FIG. 8 would be 259,130 credits.

In the game screen displays of FIG. 8, the PEDRO bandit is shown to be attempting to open a safe, which will open when the slots 322 on the safe door 323 have letters spelling out OPEN. The player is represented as attempting to find PEDRO behind one of the fifteen windows 319.

Figure 9:
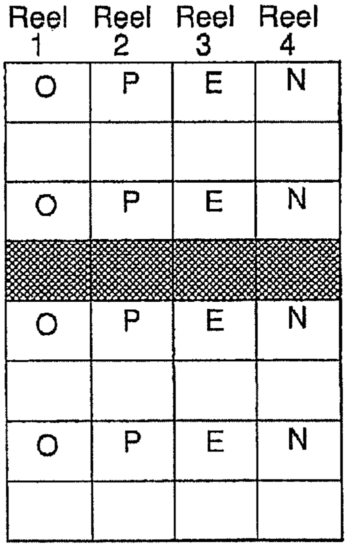
FIG. 9: shows a screen display of the game feature of FIG. 5 after a number of rounds of the feature game have been played.

Accordingly, at the start of the feature, the player selects one of the windows 319, and if this window is not the arbitrarily predetermined location of the bandit the words "No bandit" are shown. After each selection (or beforehand if the order of play is reversed), a reel associated with one of the slots 322 is spun and its stopping position randomly determined. The reels associated with the slots 322 may be as shown in FIG. 9, as having half their positions blank and half their positions displaying one of the letters from the word "Open". Accordingly, for each spin, there is a 50% chance of a letter being displayed. If a letter is displayed, then a reel associated with another of the slots 322 is spun and so on until either the word "Open" is spelled out, in which case the outcome of the feature is a losing outcome, or a blank space is displayed, in which case the player is prompted to select another window.

Figure 10:
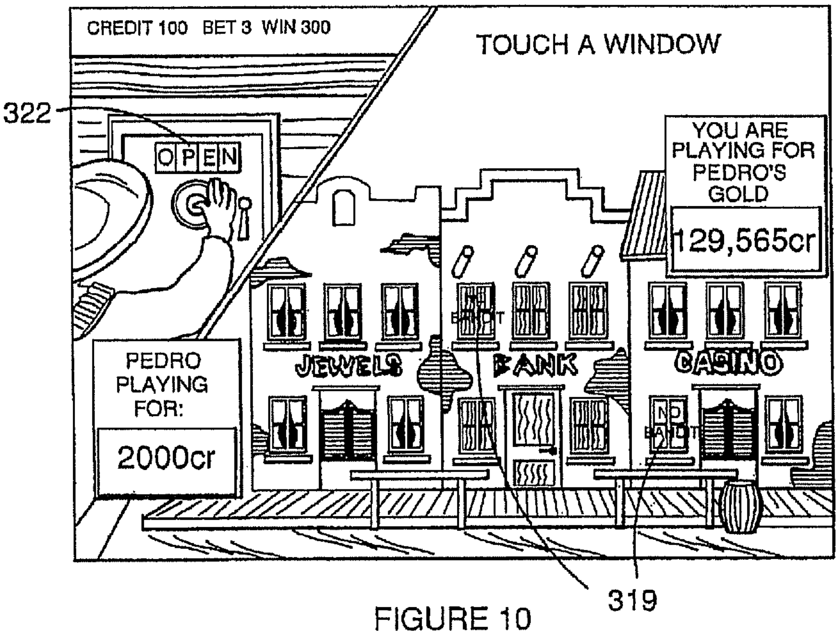
FIG. 10: shows a typical underlying reel structure for the safe game feature.

The result after two trials of this game is displayed in FIG. 10. Two letters have been revealed in slots 322 by the bandit, and two windows 319 have been selected by the player, neither of which resulted in a winning outcome.

Figure 11:
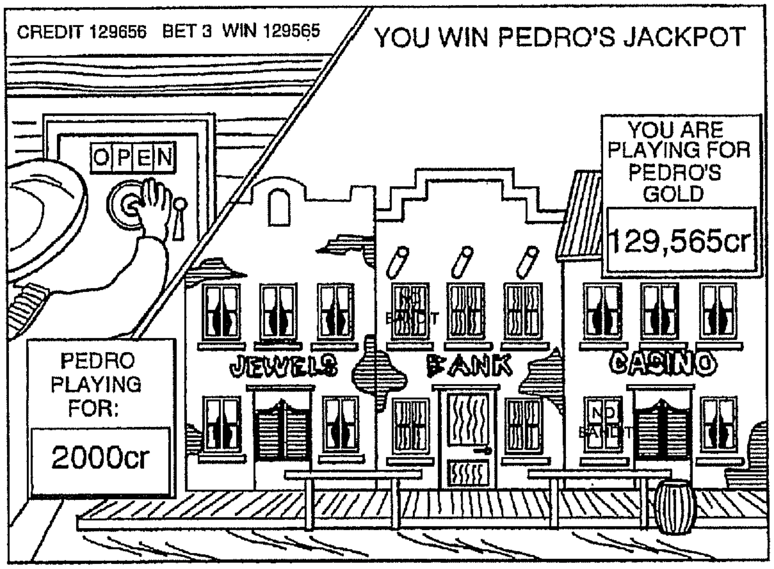
FIG. 11: shows a screen display of the game feature of FIG. 5 in which a player has won.
Figure 12:
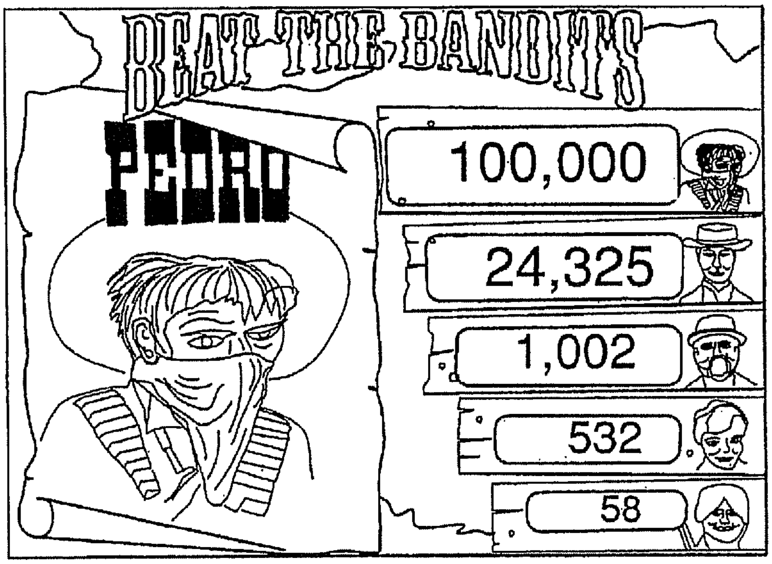
FIG. 12: shows the attract screen display of FIG. 5 after the player has won.

This process will continue (step 510) until the player selects the window which the bandit has been assigned as being behind. In this case the award amount 301*a* is won by the player (step 512) and the screen shot 326 shown in FIG. 11 is displayed. Following this, the award amount 301*a* is reset to its seed amount (step 514), 100,000 in this example, and the screen shot 328 shown in FIG. 12 is displayed, which is the same as the screen shot 300 of FIG. 5, except that the award amount 301*a* has been updated. Once the award amount 301*a* has been reset, control of the display 106 of the gaming device 202 may be returned to the jackpot server 207 or progressive controller (step 518).

Figure 13:
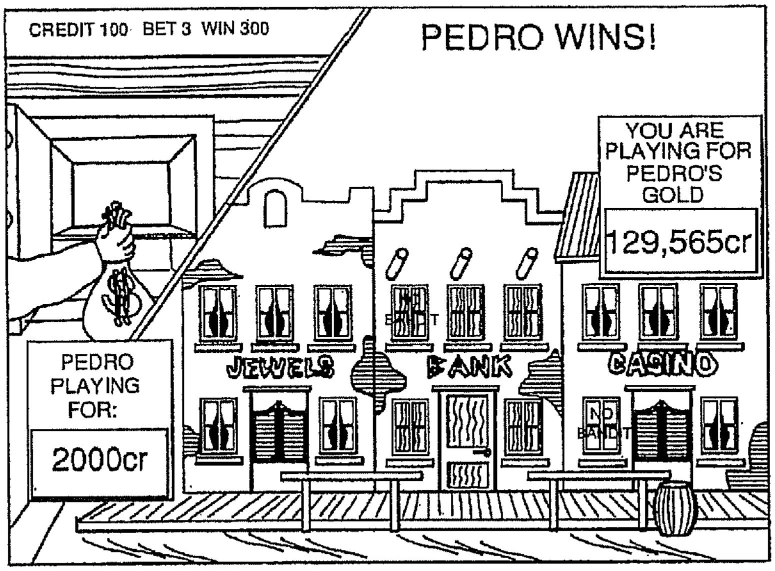
FIG. 13: shows a typical screen display of the game feature of FIG. 6*a*-6*c* when a player has lost.
Figure 14:
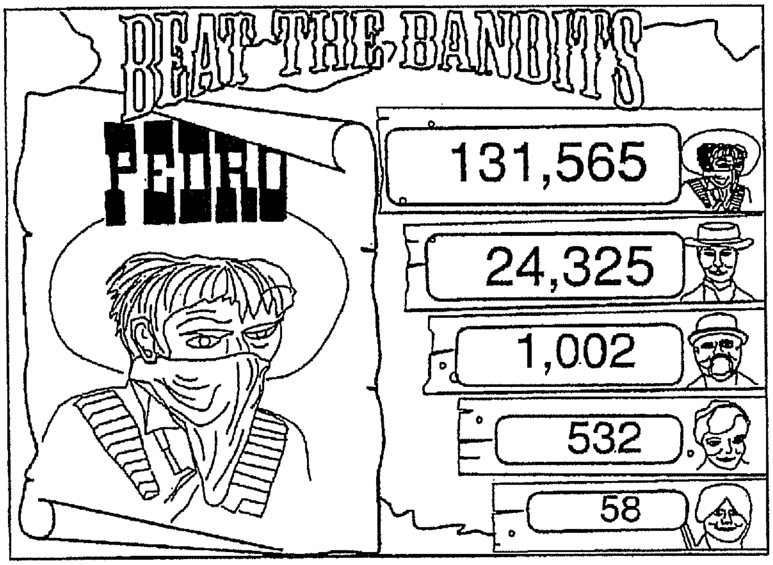
FIG. 14: shows an attract screen display of FIG. 5 after the player has lost.

If instead the bandit character spells OPEN across the slots 322 the amount displayed at 320 is added to the award amount 301*a*. This results in the screen shots 330 and 332 shown in FIGS. 13 and 14 respectively, indicating to the player that they have not won the award amount 301*a* and showing that the award amount 301*a* has been increased by the amount shown at 320 (step 516). Once the award amount 301*a* has been increased, control of the display 106 of the gaming device 202 may be returned to the jackpot server 207 or progressive controller 101 (step 518).

Each award amount 301*a*-305*a* may be associated with a separate second screen feature game that preferably shows a competition between the player, who is attempting to win one of the award amounts 301*a*-305*a*, and a bandit, who is attempting to win an amount to be added to the jackpot. Alternatively, the feature game may not be a second screen bonus and may be played using the same screen format as the game. For example, in the spinning reel game, two separate symbols may be collected each time they are displayed in a series of games, one for the bandit and one for the player, with the first player to collect a number of symbols winning. The series of games may be provided as a feature game, for example a series of free games, or the competition may occur during ordinary play of the game. Alternatively, an animation may occur in the game simply displaying the word "WIN" or "LOSE" to indicate the outcome of the feature game.

In addition to the jackpot prizes that give award amounts 301*a*-305*a*, the gaming system may maintain another jackpot prize, which may be a standard progressive based on turnover on a gaming machine or a fixed value prize. In one embodiment, the progressive is designed to have a high value or a high value fixed prize is provided, which is won only if the player "beats" all of the bandits (five the example shown) in their respective feature games.

A number of gaming devices 202 may contribute to the same award amounts 301*a*-305*a* and play common feature games to win the award amounts 301*a*-305*a*. Alternatively, the award amounts 301*a*-305*a* may be provided for a single gaming device 202.

Second Embodiment

The gaming system will now be described below in more detail in relation to a specific embodiment where the player makes selections of display positions in order to locate the hidden object(s) hidden at one or more of the display positions and the game controller 60 conducts trials to seek to complete a symbol combination. In this embodiment, an award is made to a player if they locate the hidden object(s). Persons skilled in the art will appreciate that in other embodiments the game controller could select the display positions. Persons skilled in the art will appreciate that in other embodiments an award could be made to the player if the symbol combination is completed prior to the hidden objects being located.

The game is suited to being implemented as a feature game (but could be implemented as a standalone game) and can be triggered from a base game in accordance with known techniques, including in response to: turnover, a symbol combination or a system event. Game controller 60 determines that the trigger event has occurred in accordance with techniques known in the art.

Figure 17:
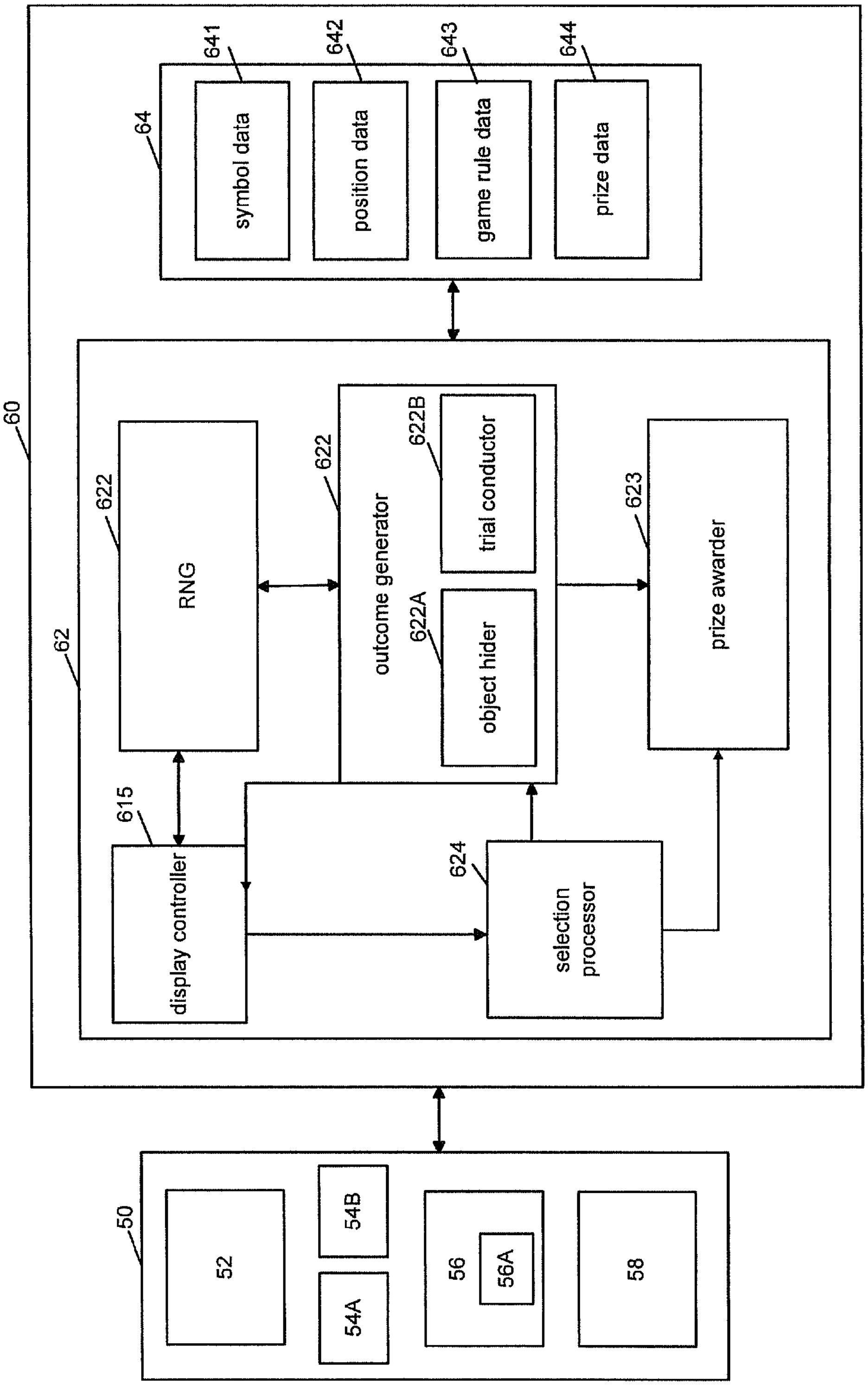
FIG. 17: shows a further block diagram of a gaming system.

With reference to FIG. 17, once the game has been triggered, the first part of the game is implemented by the outcome generator 622 by determining at what display position the object or objects are to be hidden. That is, the object hider 622A of outcome generator 622 uses the random number generator 621 to randomly select one or more of the positions (specified by position data 642) depending on the number of objects that are to be hidden. The object hider 622A updates the position data 642 to indicate which positions will correspond to a hidden object for this game.

The outcome generator 622 causes display controller 625 to update the display 54 to show the display positions corresponding to the position data, for example by displaying representations of plurality of objects that can be opened such as windows or doors to reveal whether or not there is a hidden object (the representations of hidden objects are not displayed until they are found).

In the embodiment, a dedicated display area is used for displaying the display positions. In this embodiment, on a display of the top box 26 of the gaming machine.

The game controller 60 indicates to the player by display 54 that they must remake a selection of one of the display positions. Accordingly the game play mechanism 56 includes a touch screen 54A associated with the display 54 which enables a player to make a selection by touching one of the display positions. Selection processor 624 process the selection received from the touch screen 56A and determines whether the touched display position corresponds to an object. Persons skilled in the art will appreciate that the selection processor 624 may be configured to assign a selection for the player of the player fails to make a selection in a designated time, for example by randomly determining a display position.

The selection processor 624 supplies data specifying whether or not the selected position corresponds to an object to the display controller 625 to either reveal that the display position does correspond to the hidden object by displaying the hidden object or to indicate to the player that they have missed the object for example by displaying the text "miss". If a hidden object is revealed, and the game rules specify that only one hidden object needs to be found in order for a prize to be awarded, the selection processor 624 advises the prize awarder 623 and a prize is awarded. Otherwise, the game precedes to a second stage: conduct of a trial.

The trial conductor 622B seeks to complete symbol combination 622B by employing random number generator 621 to make a selection based on symbol data 641. While other embodiments will be apparent to persons skilled in the art where the symbol can be selected by selecting from amongst a pool of symbols 641, in the embodiment, the trial conductor 622B takes the form of a reel spinner which spins a first of a plurality of reels defined by the symbol data 641. Each of the reels is able to complete part of the symbol combination. That is each reel can only complete part of the symbol combination. The first reel is spun and it is determined whether it has one of the symbols of the symbol combination. In this embodiment, if the trial conductor 622B determines that part the symbol combination has been completed by a trial it conducts a further trial. Accordingly, each time the trial is successful a further trial is conducted with the possibility that the symbol combination will be completed before the player gets to make another selection. As soon as a trial is unsuccessful, the game proceeds to a further game round where the player is offered a further selection.

A further selection is then entered by the player using the touch screen 56A and processed by the selection processor 614 in the same manner as described above, the selection processor determines based on game rule data 643 whether a quota of hidden objects required for awarding of a prize has been reached. If not, the trial conductor 622B conducts a further trial by spinning the reels again.

Accordingly, in this embodiment, the game continues until either the quota of objects specified by game rule data 643 is found or the trial conductor completes the symbol combination.

Persons skilled in the art will appreciate that a number of variations may be made to this embodiment for example, the player may be given more selections. Similarly, more trials may be conducted than selections made. In a specific embodiment, there is only one object to be found. However, in other embodiments there may be more than one object or indeed, the prize that is awarded 623 may be dependent on the number of objects that have been located when the symbol combination is completed rather than awarded solely if the player finds the quota of hidden objects before the symbol combination is completed.

Persons skilled in the art will appreciate that other techniques can be used to conduct a trial. For example, symbols could be drawn from a pool of symbols in order to try to complete symbol combination. For example, a designated number of symbols could be drawn each turn. The trials are displayed in a second display area 54B within the top box 26.

In other embodiments, the roles of the player and the game controller may be reversed with the player seeking to complete the symbol combination before the game controller locates a hidden object using some form of selection technique. In another variation, the selection of an object may be proceeded by the trial, e.g. so that a player does not get to make a selection of a display position until the game controller has been unsuccessful in completing part of the symbol combination.

Persons skilled in the art will also appreciate that the trial could be conducted in some other manner, for example by throwing a die or dice or by drawing balls or cards.

Figure 18:
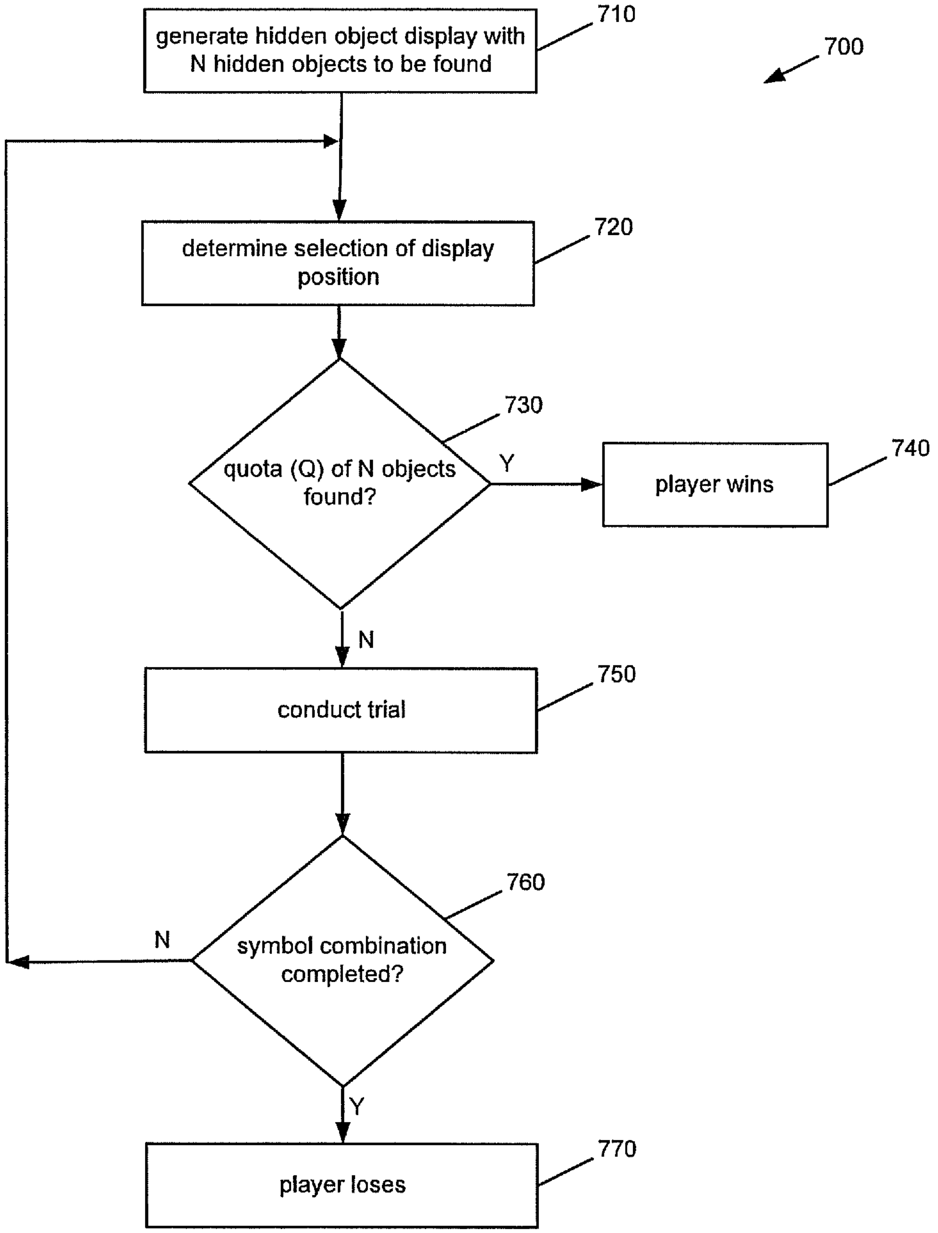
FIG. 18: shows a flow chart of an embodiment.

The method 700 of the embodiment is summarised in FIG. 18. The method involves generating hidden object display within hidden objects to be found 710 where N is a position integer of one or more depending on the game rules 643. A selection of a display position is determined 720 and it is then determined 730 whether a quota Q of N objects has been found. If the quota has been completed the player wins 740 and a prize is awarded. Otherwise a trial is conducted 750 and it is determined 760 whether a symbol combinations have been completed. If a symbol combination has not been completed the game proceeds to a further selection 720 otherwise the player loses 770.

In an alternative embodiment, all the reels are spun in a first trial but the trial conductor 622B does not get another turn if it is successful such that the player always makes a further selection before a further trial is conducted. In this respect it would be appreciated that once the symbol of one reel has been located in a trial, it is not necessary to spin that reel again so as the game progresses and the player does not find the hidden object or objects, but parts of the symbol combination are completed, fewer reels will be spun until towards the end of the game perhaps only one or two reels will need to be spun.

EXAMPLE

Figure 19:
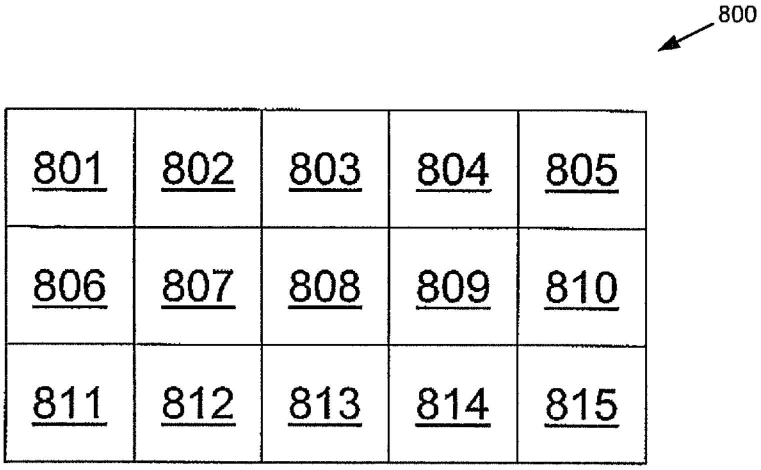
FIG. 19: shows a display of selectable display positions of an example.
Figure 20:
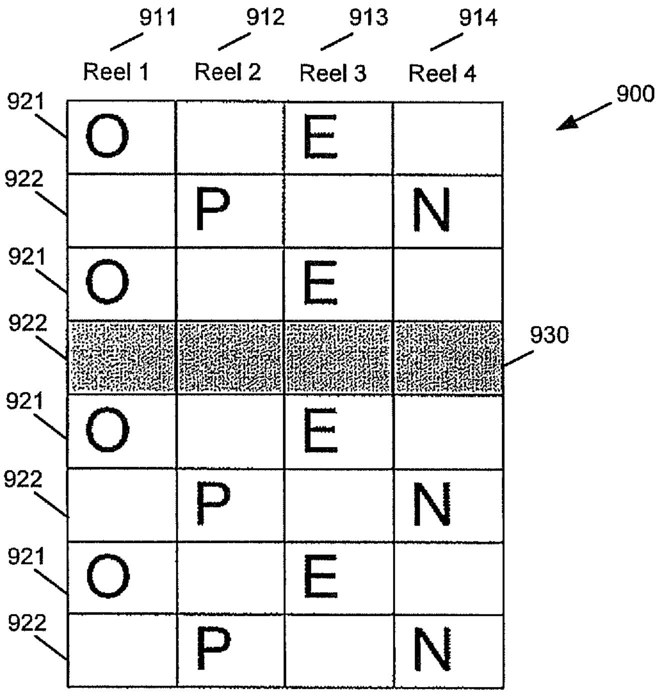
FIG. 20: illustrates a set of reels of the example.

FIGS. 19 and 20 shows a display of the display positions of the first display area (FIG. 19) which in this example are 15 windows 801 to 815 in a building. The aim of the game is for the player to locate an object in the form of a representation of a bandit. The player is required to select one of the display positions 801 to 815 to try to locate the bandit. In a separate display area (FIG. 20), there is shown a display of a combination lock of a door which can be unlocked by spinning reels 900. Each reel consists of a combination of a letter which forms part of the word OPEN and blank spaces. For example Reel 1 consists of the letter 'O' 921 and a series of blank spaces 922. Reel 2 912 consists of the letter 'P' and blank spaces, Reel 3 913 consists of the letter 'E' and blank spaces and Reel 4 914 consists of the letter 'N' and blank spaces. Only one line 930 (shown in grey) is shown to the player. This corresponds to the "combination" of the safe. In an embodiment, the "safe" is displayed in a separate area concurrently with display of the 15 windows. The display areas can be on the same screen or different screens. Persons skilled in the art will appreciate the word can be of any length appropriate to set relevant odds for the game and indeed the number of letters and number of blank spaces can be varied to alter the odds. Similarly, varying the number of display positions 801 to 815 and varying the number of hidden objects can vary the odds in order to meet the requirements of the game designer. Weighting techniques can also be used to achieve a desired probability—for example, each of the letters may be displayed on reels having 50% letters and 50% blanks but the odds of spinning up the first letter may be 70%, the second letter 60%, the third letter 40% and the last letter 20%.

As described above initially the combination display 930 is blank even though there would be a letter P in position on reel two. If the player touches a window 801-815 which reveals a "no bandit" then the bandit is shown as spinning the a reel—e.g. by animation of the bandit turning a combination lock. If a letter is not spun up, the player gets to choose another window and the bandit waits. If a letter is spun up then the bandit immediately spins the next reel and so on if correct again. The game continues until either the bandit is found or the bandit spells OPEN in which case the player loses.

Persons skilled in the art will appreciate that in other examples the technique can be varied for example such that the bandit does only has a single turn irrespective of whether they are successful or not.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

It will be understood to persons skilled in the art of the invention that many modifications may be made without departing from the spirit and scope of the invention. In particular that various features described above or in the drawings could be employed to form further embodiments.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming machine including a display and a user interface in communication with a game controller, which cooperate to provide a game in which a plurality of symbols from a symbol set are displayed on the display to form at least one outcome that is evaluated for a winning combination and in which an award is awarded if a winning combination results, the gaming machine further offering at least one jackpot prize and awarding at least one feature game on the occurrence of a predetermined event during play of the game, the feature game including a first part having a first outcome that causes an increase of the jackpot prize and a second part having a second outcome that causes the award of the jackpot prize wherein the first part and the second part of the feature game are conducted simultaneously, and wherein the first outcome or the second outcome will result depending on the first part or the second part of the feature game that is earliest to complete.

2. The gaming machine of claim 1, wherein the amount that the jackpot prize is increased if the first outcome occurs is variable between plays of the feature game.

3. The gaming machine of claim 2, wherein the amount that the jackpot prize is increased is determined by the game controller making a random selection from a predetermined set or range of possible values.

4. The gaming machine of claim 1, wherein the game includes a plurality of different feature games, and wherein each feature game has a said particular outcome that causes a said jackpot prize to increase.

5. The gaming machine of claim 4, wherein each said feature game has a separate trigger event.

6. The gaming machine of claim 4, wherein one or more of the feature games is triggered on the occurrence of a common trigger event, the particular feature game being triggered dependent on when the event occurs.

7. The gaming machine of claim 4, wherein there are a plurality of said jackpot prizes and each feature game is associated with a separate one of the jackpot prizes, wherein only the jackpot prize associated with the feature game that is played is increased on occurrence of the first particular outcome of that feature game.

8. The gaming machine of claim 7, wherein only the jackpot prize associated with the feature game that is played is awarded on occurrence of the second particular outcome of that feature game.

9. The gaming machine of claim 4, wherein a further jackpot prize is offered, the further jackpot prize being awarded when a player achieves a winning outcome in every one of the plurality of feature games.

10. A gaming system including a game controller; and a plurality of linked gaming machines, wherein at least one of the linked gaming machines includes a display and a user interface in communication with said game controller, which cooperate to provide a game in which a plurality of symbols from a symbol set are displayed on the display to form at least one outcome that is evaluated for a winning combination and in which an award is awarded if a winning combination results, and wherein the at least one gaming machine further offers at least one jackpot prize and awards at least one feature game on the occurrence of a predetermined event during play of the game, the feature game including a first part having a first outcome that causes an increase of the jackpot prize and a second part having a second outcome, and the jackpot prize is awarded by that gaming machine, wherein the first part and the second part of the feature game are conducted simultaneously, and wherein the first outcome or the second outcome will result depending on the first part or the second part of the feature game that is earliest to complete.

11. The gaming system of claim 10, wherein the at least one feature game is common to each of the linked gaming machines.

12. A method for use with a gaming machine which provides a game in which a plurality of symbols are presented to form at least one outcome, the method including providing a chance to win at least one jackpot prize through play of the gaming machine and awarding at least one feature game on the occurrence of a predetermined event during play of the game, the feature game including a first part having a first outcome that causes an increase of the jackpot prize and a second part having a second outcome, the method including awarding the jackpot prize on the occurrence of the second outcome wherein the first part and the second part of the feature game are conducted simultaneously, and wherein the first outcome or the second outcome will result depending on the first part or the second part of the feature game that is earliest to complete.

* * * * *